June 5, 1934.  A. A. THOMAS  1,961,403
DOUBLE WALLED VACUUM BOTTLE
Filed July 15, 1931  2 Sheets-Sheet 1
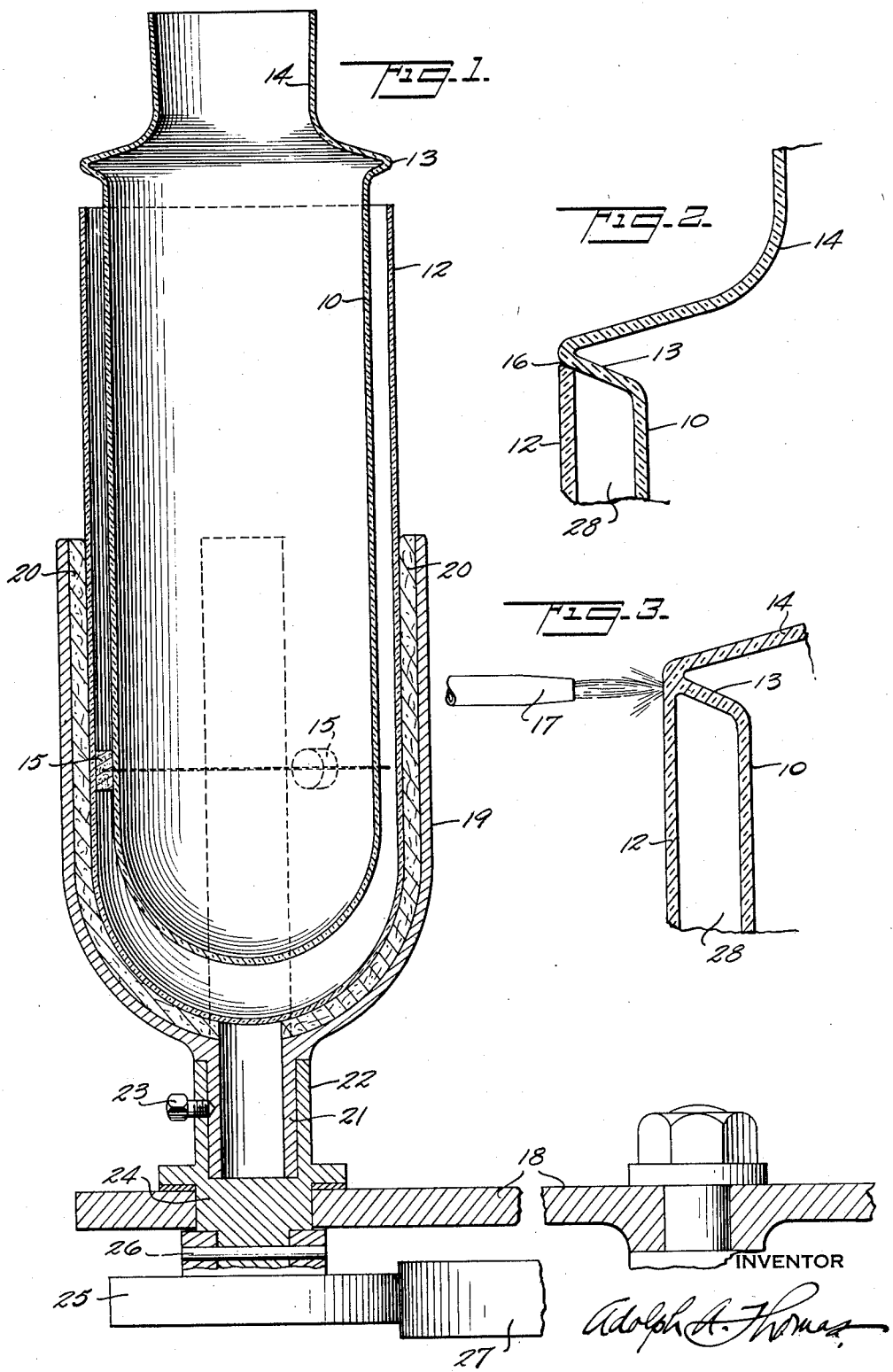
INVENTOR
Adolph A. Thomas June 5, 1934.  A. A. THOMAS  1,961,403
DOUBLE WALLED VACUUM BOTTLE
Filed July 15, 1931  2 Sheets-Sheet 2
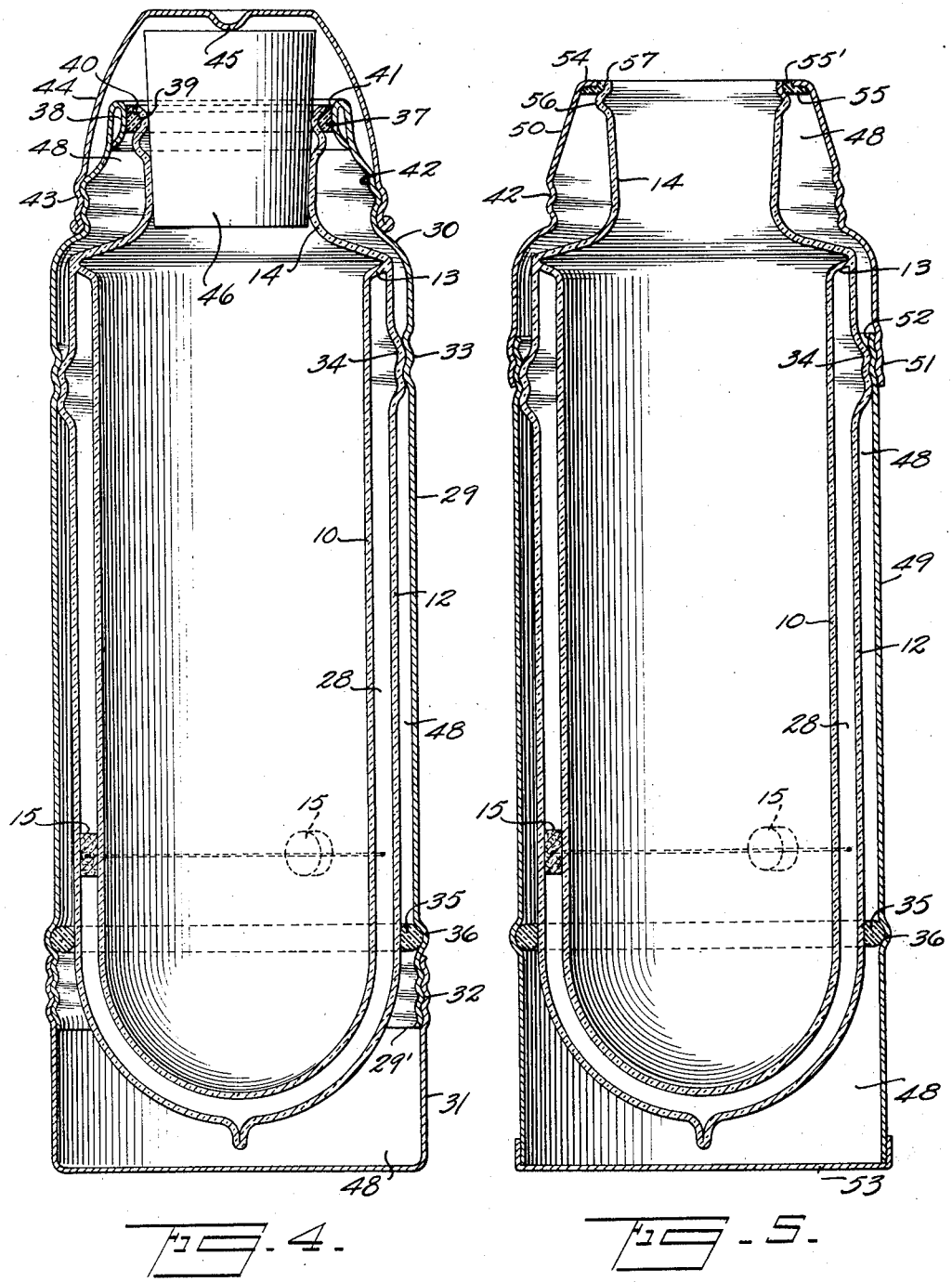
INVENTOR
Adolph A. Thomas Patented June 5, 1934

1,961,403

UNITED STATES PATENT OFFICE 1,961,403

DOUBLE-WALLED VACUUM BOTTLE

Adolph A. Thomas, New York, N. Y., assignor to The American Thermos Bottle Company, Norwich, Ohio, a corporation of Ohio Application July 15, 1931, Serial No. 550,871

13 Claims. (Cl. 215—13)

This invention relates to the art of double-walled vacuum bottles and its object is to provide a bottle of simplified construction and decreased cost of manufacture.

It is generally understood that a double-walled vacuum bottle comprises a pair of nested glass cylinders fused together at the top and separated all around by a narrow space from which the air has been exhausted for heat-insulation. A pair of assembled cylinders is usually called a filler, which forms the container of the bottle and is enclosed in a suitable outer casing to make a complete article for the market. In vacuum bottles with contracted necks, there have always been certain difficulties in making the fillers, because the two cylinders as molded can obviously not be placed one inside the other. From the very beginning of the vacuum bottle art, it has been the common practice to assemble the fillers in this way: The outer cylinders are blown about 4½ inches longer than necessary for the completed fillers. The rounded bottom of each outer cylinder is cut off to permit insertion of the inner cylinder, and the nested cylinders are sealed at the top by fusing the rims together in an integral joint. The open end of the outer cylinder extends about two inches beyond the bottom of the inner cylinder, and this open extension of surplus glass is shaped with a hand tool into a closed rounded bottom.

The foregoing method of assembling the fillers has serious drawbacks from a practical standpoint. In the first place, the outer cylinders must be made over four inches longer than required in the finished product. This excess glass means increased cost of material and labor. Secondly, the bottoms cut off the outer cylinders can not be used over and are waste glass. The same is true of the surplus glass that is worked off in shaping the cylindrical extensions into rounded bottoms, and this waste manifestly increases the cost of each filler. Then, too, it requires an expert glassman to form the bottoms with a hand tool, and the work is necessarily slow. This represents another item adding to the cost of the finished product. But aside from the question of increased cost, the new bottoms put on the outer cylinders by the old hand method are not entirely satisfactory, for they are liable to be uneven in shape and of varying thickness. If these bottoms are too thin in spots, as sometimes happens, the filler is weak and liable to break. It must be remembered that, after the space between the cylinders is exhausted, the glass walls are subject to considerable strains due to atmospheric pressure. Consequently, it is highly important that the glass walls of the cylinders should have substantially uniform thickness. There is no difficulty in obtaining this uniformity in blown glass, but it is extremely difficult, even for an experienced glass worker, to get even approximate uniformity of shape and thickness in the hand-worked bottoms of the outer cylinders.

The above objections and disadvantages inherent in the old method of nesting the glass cylinders in vacuum bottles are entirely eliminated by the use of my invention, which provides a double-walled filler of novel construction and easy assembly, thereby reducing the cost of manufacture. According to the present improvement, the inner and outer cylinders are blown in separate molds, and no excess of length in the outer cylinder is necessary. The inner cylinder is formed with an annular shoulder from which the glass tapers upward to form a short contracted neck. The outer cylinder is molded without a tapering top and has an open circular mouth of slightly greater diameter than the body of the inner cylinder. It is therefore possible to insert the inner cylinder into the outer one until the projecting shoulder of the inner cylinder engages the top rim of the outer cylinder. In other words, the inner cylinder is concentrically supported on the rim of the outer one and in this position the two parts are fused together along their circle of contact to form a double-walled unit. This sealing operation requires no skilled hand labor, for it can be done by simple automatic machinery at very low cost. Furthermore, the glass walls of the completed filler are of substantially uniform thickness throughout, because the cylinders are used in their original blown shape.

In one embodiment of my invention, the outer cylinder is provided with screwthreads for attaching it directly to the outer casing, so that no separate support for the filler is needed. The casing has a tapering breast section which may be integral with the cylindrical body of the casing, whereby further simplification of the final article is obtained. The novel features and practical advantages of my invention will be understood from a description of the accompanying drawings, in which—

Fig. 1 shows the two cylinders of a filler about to be assembled on the table of a sealing machine;

Figs. 2 and 3 are enlarged fragmentary views of the nested cylinders before and after sealing;

Figs. 4 and 5 illustrate in vertical section two forms of a complete bottle embodying my new filler; and Fig. 6 is a fragmentary detail applicable to Figs. 4 and 5, showing a heat-insulating band between the screwthreads of the outer casing and those of the filler.

Referring to Fig. 1, the filler in its simplest form consists of an inner cylinder 10 and an outer cylinder 12, each formed of glass in a single piece, preferably by blowing to assure uniform thickness. Each cylinder, as it comes from the mold, has a closed rounded bottom and an open top. The inner cylinder 10 has an outwardly projecting annular rib or shoulder 13 from which extends a contracting or tapering neck 14. The width of the outer cylinder 12 is substantially equal to the diameter of shoulder 13, so that the inner cylinder can be inserted into the outer cylinder until the shoulder rests on the top rim of the outer cylinder. This will be clear from Fig. 2. The sloping underside of shoulder 13 assists in automatically centering the nested cylinders, which may also be steadied by small pads 15 of asbestos or the like. These pads are placed on the inner cylinder before it is inserted into the outer cylinder. The nested cylinders are fused together along their circular contact line or edge 16 to form an integral double-walled glass unit. Fig. 3 shows a gas nozzle 17 for directing a flame against the contact edge 16, it being understood that either the heating means or the nested cylinders are slowly rotated during the fusing operation to produce a substantially uniform seal.

The assembling of the cylinders is conveniently done on a rotary table 18 which carries one or more cup-shaped supports 19 for holding the outer cylinders 12 in upright position. The supports 19 may consist of strips or fingers shaped to receive the outer cylinders in a snug fit, and preferably a lining 20 of asbestos or the like is used to guard against breaking of the thin glass. Each support 19 has a tubular extension 21 adapted to fit into a hollow rotary post 22, and a set-screw 23 removably locks the two parts together. The post 22 has a bearing portion 24 which passes through the table 18 and is coupled to a gear or pulley 25 by a cross-pin 26 or otherwise. A wheel 27, operated at proper speed from a suitable source of power, engages the driving member 25 to rotate the support 19 during the sealing operation. If several supports 19 are used, the table 18 is rotated a certain amount at predetermined intervals to carry the nested cylinders from initial to final position, as will be understood without further illustration or description. Any practical apparatus may be employed for assembling and fusing the molded cylinders into a double-walled filler.

It should be noted that the cylinders are nested in the form in which they come from the mold, so that no mutilation and reshaping of either cylinder is necessary. Consequently, the resultant double-walled filler can be produced at a considerably lower cost than the old-type fillers. For practical purposes, the heat-insulating efficiency of my new filler is not impaired (certainly not in an appreciable degree) by the fact that the double-walled evacuated space 28 does not go all the way to the top rim of the inner cylinder. The single-walled neck 14 is so short that the liquid contents of the filler will usually not extend above the shoulder 13 and will therefore be completely surrounded by the insulating space 28. The walls of this space may be silvered to improve its heat-insulating property. The neck 14 need not in all cases be contracted, for it is possible to shape the inner cylinder with a neck that goes straight up from the outer edge of shoulder 13. If desired, the outer cylinder 12 may be molded with a short lip at the rim to provide extra glass for the sealed joint. When I speak of inserting the inner cylinder into the outer one, I include the equivalent reverse process of telescoping the outer cylinder over the inner one.

The double-walled glass filler 10—12 is mounted in an outer casing of suitable design to make an attractive bottle for the market. There are various ways of supporting the filler in the casing, but at the present time I prefer a screw-threaded connection between the filler and the casing, whereby the matter is directly attached to the casing. For this purpose the casing and the filler have inter-engaging screwthreads, and in the constructions illustrated in Figs. 4 and 5, the screwthreads on the filler are molded integral with the outer cylinder 12. In Fig. 4, the outer cylindrical casing 29 has an integral breast section 30 and a separate bottom cap 31 which screws on and off at 32. The two casing parts may be sheet metal or molded composition material, the latter being desirable on account of its heat-insulating quality. The outer casing 29 has screwthreads 33 adapted to be engaged by screwthreads 34 on the outer cylinder 12, whereby the latter is directly connected to and supported by the outer casing. The screwthreads 34 are molded as an integral part of cylinder 12 in a single operation. To steady the base of the filler against lateral shocks, I may insert a ring 35 of soft rubber or the like between cylinder 12 and casing 29, which has an annular recess 36 for holding the ring in position. A second rubber ring 37 is mounted on the outer end of neck 14, and the breast section 30 has an inner flange 38 arranged to engage the ring and hold it compressed. The neck 14 is formed with a recess 39 in which the ring 37 is securely seated. The rim 40 of the neck is spaced from the adjacent flange 38, and this space is filled by the compresesd ring 37, as indicated at 41, whereby a liquid-tight and heat-insulating joint is obtained. The tapering breast section 30 has integral screwthreads 42 arranged to be engaged by screwthreads 43 of a cap or cup 44, which may be of sheet metal or composition material like the casing 29. A central button 45 formed on the base of cup 44 presses against a stopper 46 and holds it securely in liquid-tight closing position.

Attention is called to the fact that the filler 10—12 in Fig. 4 is out of contact with casing 29, except at the supporting screwthreads 33—34, which present only a small area. If the casing 29 is of sheet metal, I may interpose a heat-insulating ring 47 between the screwthreads 33—34, as shown in Fig. 6. The ring 47 may be a flat rubber band stretched over the screwthreads 34 to which it conforms and tightly adheres, or it may be a strip of fabric cemented over the screwthreads. A further function of ring 47 is that of a shock absorber, so that the glass filler 10—12 is thoroughly heat-insulated from the outer casing and is yieldably but firmly suspended therein. As additional means for improving the heat-insulation of the filler, the space 48 may be filled with carbon dioxide gas at atmospheric pressure, or with any other suitable gas having a better heat-insulating capacity than air. It is not necessary to use a pump for that purpose, for the bottle may be assembled by hand in a tank of carbon dioxide gas, which is heavier than air and does not easily escape. Before assembling the parts (whether in air or in an atmosphere of insulating gas), the rubber ring 35 is inserted in the recess 36 of casing 29 and the other ring 37 is placed in groove 39 of the filler neck 14, both rings being fitted as tightly as possible. The filler 10—12 is now inserted through the open bottom of casing 29 and screwed tight into final position as shown in Fig. 4. Enough of the base of the filler projects beyond the lower edge 29' of the outer casing to permit a firm grasp of the filler by hand or by means of a suitable tool during the assembling operation. This arrangement also makes it easy to remove a filler when necessary. After the filler has been properly inserted, the cap 31 is screwed on.

In the bottle of Fig. 5, the outer casing 49 has a separate breast section 50 which is provided with screwthreads 51 arranged to engage screwthreads 52 at the top of the casing. The bottom 53 of casing 49 is permanently secured thereto in any practical way, and may even be an integral part of the casing. The screwthreads 34 on filler 10—12 engage the inner side of screwthreads 52 for supporting the filler, which is inserted through the open mouth of the casing. The breast section 50 has an inwardly extending rim 54, to the underside of which is attached a soft rubber ring or washer 55. The inner portion 55' of ring 55 projects inwardly to form an annular flexible tongue or lip, which is normally flat. The neck 14 of the filler is provided with an annular bead 56 adapted to form an abutment for the flexible lip 55' and push it upward when the breast section is screwed home. This automatic flexing of lip 55' completely fills the space between the top edge 57 of the filler and the adjacent edge of rim 54. The flexed lip 55' is held compressed by the bead 56 when the parts are in final assembled position, so that a liquid-tight seal is formed. To remove the filler from the bottle in Fig. 5, it is only necessary to unscrew the breast section 50, whereby the top portion of the filler is exposed so as to be easily grasped by the fingers and screwed off. Otherwise, what has been said for Fig. 4 applies fully to Fig. 5, without the need of repetition.

Although I have shown and described certain specific constructions, I want it understood that my invention is not limited to the details set forth. Changes and modifications may be made within the scope of the following claims. Throughout the description and claims I use the word "bottle" as a convenient term to include any kind, shape and size of heat-insulated container of the vacuum type.

I claim as my invention:

1. As a new article of manufacture, a filler for vacuum bottles comprising an inner glass cylinder closed at its bottom and provided at its top with a neck of reduced diameter and having an integral annular shoulder extending laterally outward therefrom approximately at the junction of the neck with the body portion thereof, an outer glass cylinder of greater diameter than said inner glass cylinder disposed over the latter and seated at its upper end against said shoulder, and a fused joint between said outer glass cylinder and said shoulder.

2. As a new article of manufacture, a filler for vacuum bottles comprising an outer glass cylinder, an inner glass cylinder of less diameter than said outer glass cylinder disposed therein and having an integral annular shoulder extending laterally outward therefrom at a point spaced downwardly from its top, both cylinders being closed at their bottoms and the inner cylinder being open at its top, the outer glass cylinder being seated at its top against the aforesaid annular shoulder of the inner cylinder, and a fused joint between the outer cylinder and said shoulder, said cylinders being separately formed and shaped for assembly with each other to final operative position solely by a relative telescopic movement prior to the fusing together of said cylinders.

3. As a new article of manufacture for use in vacuum bottles, a double-walled filler comprising an inner cylinder of glass having a main cylindrical body and a contracted neck, an annular shoulder of greater diameter than said body and integral therewith at the upper end thereof, an outer cylinder of glass having an open mouth of greater diameter than the main body of said inner cylinder, whereby said outer cylinder may be placed in its original form over said inner cylinder to bring the open mouth end thereof into engagement with said annular shoulder, and a sealed joint between said outer cylinder and said shoulder.

4. As a new article of manufacture for use in vacuum bottles, a double-walled filler comprising an inner member of glass having a main cylindrical body portion and a neck portion, an annular shoulder integral with said body portion at the junction of said body portion with said neck portion, said annular shoulder being of greater diameter than said body portion, an outer cylinder of glass having an open mouth of greater diameter than the main body of said inner cylinder, whereby said outer cylinder may be placed in its original form over said inner cylinder to bring the open mouth thereof into engagement with said annular shoulder, and a fused joint between said outer cylinder and said shoulder.

5. As a new article of manufacture for use in vacuum bottles, a double-walled glass filler comprising an inner glass cylinder having a neck and an integral annular shoulder below the neck, the main body of said cylinder below said shoulder being of less diameter than the outer edge of said shoulder, and an outer cylinder having an open mouth of substantially the same diameter as the outer edge of said shoulder, whereby the inner cylinder can be inserted in its original form through said mouth into the outer cylinder, and a sealed joint uniting the rim of said mouth to said shoulder, said cylinders being separated below said joint by an annular space adapted to be evacuated.

6. A double-walled vacuum bottle comprising an outer casing and an inside filler of glass, an elastic ring arranged between the top of said casing and the top of said filler to form a liquid-tight joint, a second elastic ring arranged between the casing and the lower portion of said filler to guard the latter against side shocks, and cooperating means provided on said casing and filler between said rings for removably securing the filler to the casing.

7. A double-walled vacuum bottle comprising an outer cylindrical casing provided with a tapering breast section, screwthreads on said casing below said breast section, a glass filler mounted in said casing, said filler comprising a double-walled cylindrical body and a single-walled tapering neck, the outer wall of said cylindrical body having screwthreads arranged to engage the screwthreads on said casing, whereby said filler is removably connected to said casing, and a rubber ring interposed between said breast section and the top rim of said neck, said ring being held under compression to form a liquid-tight joint.

8. A double-walled vacuum bottle comprising an outer cylindrical casing provided with a tapering breast section, there being an inner annular recess in the lower portion of said casing, screwthreads on said casing below said breast section, a glass filler mounted in said casing, said filler comprising a double-walled cylindrical body and a single-walled tapering neck, the outer wall of said cylindrical body having screwthreads arranged to engage the screwthreads on said casing, whereby said filler is removably connected to said casing, and a rubber ring in said inner recess engaged by the bottom portion of said filler to guard the latter against side shocks.

9. A double-walled vacuum bottle comprising an outer cylindrical casing of sheet metal formed with an integral tapering breast section, screwthreads on the cylindrical body of said casing, a double-walled glass filler having a cylindrical body and a tapering neck, screwthreads on the cylindrical body of said filler arranged to engage the screwthreads on said casing, whereby said filler is directly attached to said casing, the bottom of said filler extending beyond the lower edge of said casing to permit insertion of the filler through the open bottom of the casing, a cap secured to the bottom of said casing after the filler has been inserted, and means for making a liquid-tight heat-insulating joint between the top of said breast section and the rim of said filler.

10. A double-walled vacuum bottle comprising an outer cylindrical casing closed at the bottom and open at the top, screwthreads at the top of said casing, a tapering breast section having screwthreads arranged to fit over the screwthreads on said casing, a double-walled glass filler having a cylindrical body and a tapering neck, screwthreads on the cylindrical body of said filler arranged to engage the inside of said screwthreads on the casing, whereby said filler is insertable through the open top of said casing and is removably secured to the inner wall thereof, and a rubber washer secured to the top edge of said breast section and projecting inwardly thereof to form a circular flexible tongue adapted to be bent into sealing contact with the top rim of the filler when the breast section is screwed in position on the casing.

11. A double-walled vacuum container comprising an outer casing, a double-walled filler in said casing, a separable screwthreaded connection between said filler and casing for securing these parts together, said connection including an elastic non-metallic ring engaging said filler and adapted to absorb shocks, and a compressed gasket above said screwthreaded connection to form a liquid-tight joint around the top rim of the filler.

12. A double-walled vacuum container comprising an outer casing, a double-walled filler housed in said casing, a separable screwthreaded connection between said filler and casing for securing these parts together, said connection comprising cooperating screw-threads on said casing and filler and a soft rubber ring compressed between said screw-threads to absorb shocks, a second rubber ring above said connection to form a liquid-tight joint between the top rim of the filler and the casing, and a third rubber ring between said filler and casing below said connection to guard the filler against lateral shocks.

13. A double-walled vacuum container comprising an outer casing provided with interior screw threads, a double-walled filler enclosed within said casing and having exterior screw threads, and a non-metallic shock-absorbing ring interposed between the casing and the filler and having exterior and interior threads respectively engaging the threads of the casing and the filler.

ADOLPH A. THOMAS.